United States Patent [19]
Palmonari et al.

[11] 4,236,321
[45] Dec. 2, 1980

[54] DRYING CHAMBER

[76] Inventors: Carlo Palmonari, Via Grimaldi, 5; Gabriele Gavioli, Via Panigale, 6, both of Bologna, Italy

[21] Appl. No.: 30,595

[22] Filed: Apr. 16, 1979

[30] Foreign Application Priority Data

Apr. 19, 1978 [IT] Italy ................................. 3397 A/78

[51] Int. Cl.³ .............................................. F26B 17/10
[52] U.S. Cl. .................................... 34/57 E; 34/57 R; 159/4 E
[58] Field of Search .................... 159/4 E, 4 S, 4 MS, 159/4 VM; 34/57 R, 57 A, 57 E, 169

[56] References Cited
U.S. PATENT DOCUMENTS

| | | | |
|---|---|---|---|
| 1,989,406 | 1/1935 | Doolittle | 159/4 S |
| 2,069,193 | 1/1937 | Behr et al. | 34/169 |
| 3,443,621 | 5/1969 | Dubreuil | 159/4 E |
| 3,474,849 | 10/1969 | Inchausti | 159/4 E |
| 3,616,834 | 11/1971 | Hansen et al. | 159/4 E |

*Primary Examiner*—Larry I. Schwartz
*Attorney, Agent, or Firm*—Guido Modiano; Albert Josif

[57] ABSTRACT

A drying apparatus comprises a vertical axis cylindrical chamber at the top of which an annular chamber is formed having a central wall communicating with the cylindrical chamber and an outer wall communicating with an air inlet tangential duct adapted to be closed by a series of butterfly valves. A vertically slidable bell element is arranged inside the cylindrical chamber for defining together with the hopper-like base thereof an adjustable slot for the passage therethrough of the dried products towards a withdrawal door.

3 Claims, 2 Drawing Figures

DRYING CHAMBER

BACKGROUND OF THE INVENTION

This invention relates to a drying apparatus for preparing products of the type of lyophilized products, or controlling the moisture content and particle size thereof.

Known are drying apparatuses which comprise essentially a vertical axis cylindrical body, connected at the top to a hot air delivery intended for introducing air tangentially into the body such as to create, inside the body, an air vortex wherein the suspension or acqueous solution of the product to be dried is atomized: said body has at the bottom an air suction duct and a door for withdrawing the dried products. Such conventional drying apparatuses are quite effective but have drawbacks related to the fact that it is impossible to regulate the hot air tangential velocity values, the size of the passage ports for the dried product, and the height at which the suspension to be dried becomes atomized: on the other hand, it has been ascertained that to be able to effectively treat different products, it is necessary indeed to control or adjust the cited parameters.

SUMMARY OF THE INVENTION

This invention sets out to obviate the cited drawbacks of conventional drying apparatuses, namely to make it possible to arrange that a chamber is provided wherein the hot air velocity, dried product passage port sizes, and atomization height values can be effectively adjusted.

Within that general aim it is possible to arrange that the drying apparatus according to the invention is of simple construction, relatively easy to manufacture, reliable in use, effective in operation, and of comparatively low cost.

According to one aspect of the present invention there is provided a drying apparatus for the production of dry material from a liquid suspension thereof comprising a cylindrical drying chamber with vertical axis and having a lower frusto-conical portion tapering downwards to a coaxial cylindrical portion, a conical portion extending downwards from said cylindrical portion and provided with a discharge door, an exhaust flue axially extending through said frusto-conical and cylindrical portion and having an upper inlet opening above which a hood element is arranged, a pipe for supplying the liquid suspension axially extending through said flue and hood element and communicating with an injector vertically positionable above said hood element, an annular chamber arranged above the cylindrical chamber and coaxially thereto and having an outer cylindrical wall with an opening for tangential connection of an air inlet and an inner cylindrical wall consisting of a fixed part and a movable part telescopically guided inside said fixed part to define an adjustable air passage between said movale part and the top of said annualr chamber, the apparatus further comprising valve means arranged at said opening for gradually controlling the air flow therethrough.

BRIEF DESCRIPTION OF THE DRAWING

Further features will be more clearly understood from the following description of a preferred, albeit not exclusive, embodiment of a drying apparatus according to the invention, which is illustrated by way of example in the accompanying drawing, where.

DESCRIPTION OF A PREFERRED EMBODIMENT

Figures 1, 2:
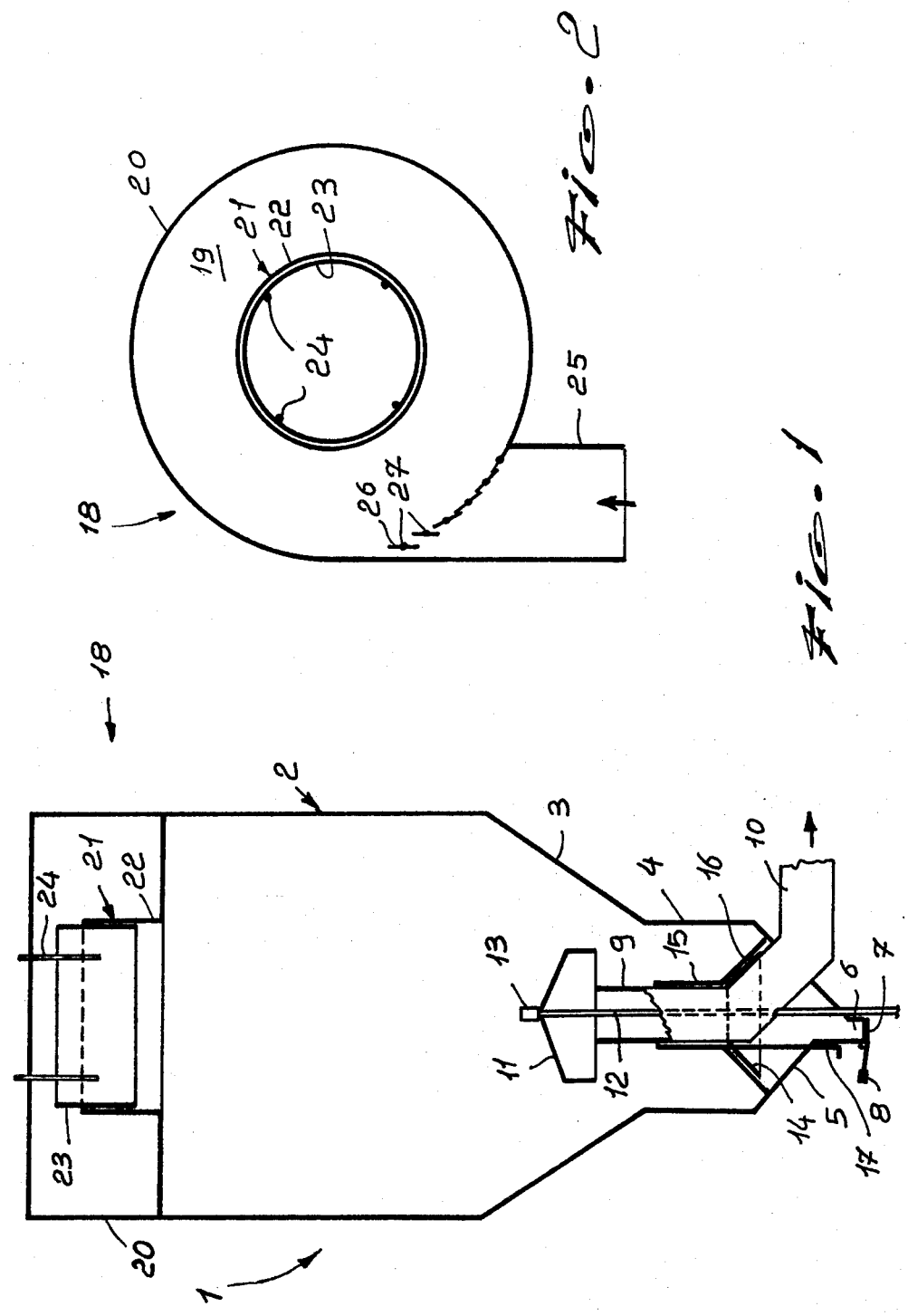
FIG. 1 is a schematical side elevation and section view of the drying apparatus according to the invention.
FIG. 2 is a cross-sectional view of the apparatus of FIG. 1 along the annular chamber.

With reference to the cited drawing figures, the drying apparatus of this invention is indicated generally at 1.

The drying apparatus 1 is a type comprising a cylindrical chamber which has at its bottom or lower portion a truncate cone portion 3 followed by a reduced diameter cylindrical portion 4 which narrows to a hopper 5 ending at its base in a tubular stub pipe 6, closed at the bottom by a hinged door 7 having a counterweight 8.

To the lower portion of the body 2, there is attached axially a cylindrical flue 9 which protrudes from the hopper 5 with a horizontal portion 10 connected to an exhaust fan: the opening of the flue 9 is protected at the top by a hood 11. Axially to the flue, a pipe 12 is mounted which is slidable vertically and carries at the top an injector 13, it being connected at the bottom to a delivery of the suspension or aqueous solution to be dried.

To the base of the flue 9, there is affixed a a conical housing 14 which is open and divergent downwardly and covers the lap of the flue 9; along the flue 9 a tubular element 15 is mounted for vertical sliding movement which carries at the bottom a conical bell element 16 rigid therewith, the bottom edge of said bell element defining, together with the hopper 5, an adjustable height port the height whereof is adjusted by moving and then locking a stem 17 rigid with the element 15 and projecting out of the hopper base.

The cylindrical chamber 2 is shut at the top by a cover 18 wherein an annular chamber 19 is defined between an outer wall 20 and inner wall 21, the inner wall 21 is made in two parts, one part 22 being fixed and the other part 23 telescopically guided inside the part 22; to the movable part 23, four stems 24 are welded which protrude upwardly through the top of the cover 18. The vertical movement of said stems by operator allows the passage port for the air from the annular chamber 19 to the body 2 to be registered.

The outer wall 20 has an opening in communication to a tangential drying air inlet duct 25; along the opening through the wall 20, there is arranged a valve consisting of a plurality of vanes 26 which are hinged to vertical axis pivot pins 27 and, when closed, slightly overlap each other to restore the outer wall to its original shape.

By suitably manipulating the vanes 26, by the operators the tangential velocity of the drying air can be varied, specifically the velocity is decreased when the vanes are wide open, and gradually increased as the vanes are moved towards their closed position, as shown in FIG. 2.

By raising the part 23, one is able to vary the air passage port, between the movable part 23 and the top of the annualar chamber 19 thus influencing the radial velocity 5 component. The raising or lowering of the injector 13 permits the suspension or acqueous solution of the product to be dried, to be sprayed at an optimal height, which height must be changed to suit the products being treated.

Furthermore, by shifting the bell element 16 position, it becomes possible to vary, as mentioned, the dried product passage port: this is important because during the operation of the drying apparatus at said port, a layer of dried product is formed which separates the drying area from take-off or delivery one: by controlling said layer, which must be minimal, compatibly with the necessity of separating the two areas from each other, one is enabled to influence the product characteristics.

It should be further noted that the vanes 26 create extremely reduced disturbances in the hot air flow, thereby when the air enters the body 2 it forms an extremely regular vortex, which is essential to a homogeneous treatment of the product being processed.

It will be appreciated that the invention achieves its objects, and in particular affords ideal conditions of drying air velocity, atomizing height of the product to be dried, and residence of the dried product onto the conical portion 3 of the drying apparatus.

What is claimed is:

1. A drying apparatus for the production of dry material from a liquid suspension thereof comprising a cylindrical drying chamber with vertical axis and having a lower frusto-conical portion tapering downwards to a coaxial cylindrical portion, a conical portion extending downwards from said cylindrical portion and provided with a discharge door, an exhaust flue axially extending through said frusto-conical and cylindrical portion and having an upper inlet opening above which a hood element is arranged, a pipe for supplying the liquid suspension axially extending through said flue and hood element and communicating with an injector vertically positionable above said hood element, an annular chamber arranged above the cylindrical chamber and coaxially thereto and having an outer cylindrical wall with an opening for tangential connection of an air inlet and an inner cylindrical wall consisting of a fixed part and a movable part telescopically guided inside said fixed part to define an adjustable air passage between said movable part and the top of said annular chamber, the apparatus further comprising valve means arranged at said opening for gradually controlling the air flow therethrough.

2. A drying apparatus as claimed in claim 1 further comprising a bell element vertically slidable on said flue and resting on said hopper and means for moving said bell element along said flue to permit discharge of dried material towards said discharge door.

3. A drying apparatus as claimed in claim 1 wherein said valve means comprises a plurality of adjacent vanes pivoted about parallel axes lying in the plane of said outer wall and actuated so as to cause the tangential velocity of the drying air in the annular chamber to decrease by gradually opening said vanes.

* * * * *